US011323355B1

(12) United States Patent
Gupta et al.

(10) Patent No.: US 11,323,355 B1
(45) Date of Patent: May 3, 2022

(54) PARTITION ABSTRACTION IN DISTRIBUTED COMPUTING SYSTEMS

(71) Applicant: Microsoft Technology Licensing, LLC, Redmond, WA (US)

(72) Inventors: Sumit Gupta, Burnaby (CA); Amit Kumar Nanda, Sammamish, WA (US); Vikrant Arora, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/464,275

(22) Filed: Sep. 1, 2021

(51) Int. Cl.
*G06F 15/16* (2006.01)
*H04L 45/00* (2022.01)
*H04L 67/60* (2022.01)
*H04L 67/1097* (2022.01)

(52) U.S. Cl.
CPC .......... *H04L 45/04* (2013.01); *H04L 67/1097* (2013.01); *H04L 67/32* (2013.01)

(58) Field of Classification Search
CPC ...... H04L 45/04; H04L 67/1097; H04L 67/32
USPC ........................................ 709/201, 225, 226
See application file for complete search history.

(56) References Cited

U.S. PATENT DOCUMENTS

| | | |
|---|---|---|
| 6,173,374 B1 | 1/2001 | Heil et al. |
| 6,351,775 B1 | 2/2002 | Yu et al. |
| 7,590,747 B2 | 9/2009 | Coates et al. |
| 8,074,289 B1 | 12/2011 | Carpentier et al. |
| 8,255,420 B2 | 8/2012 | Abushanab et al. |
| 8,997,124 B2 | 3/2015 | Bernbo et al. |
| 10,372,499 B1 | 8/2019 | Radhakrishnan et al. |
| 10,877,669 B1* | 12/2020 | Sivasubramanian ........ H04L 41/0896 |
| 2005/0004979 A1* | 1/2005 | Berkowitz .......... G06F 11/2097 711/162 |
| 2006/0195652 A1* | 8/2006 | Lundeby ............... G06F 9/4401 711/111 |
| 2006/0198525 A1* | 9/2006 | Brey ...................... H04L 63/06 380/278 |
| 2009/0216723 A1* | 8/2009 | Harvey ............... H04L 61/1576 708/304 |
| 2011/0270855 A1* | 11/2011 | Antonysamy ....... G06F 16/1794 707/756 |

(Continued)

OTHER PUBLICATIONS

"Creating and Accepting a VPC Peering Connection", Retrieved from: https://web.archive.org/web/20210504070611/https:/docs.aws.amazon.com/vpc/latest/peering/create-vpc-peering-connection.html, May 4, 2021, 5 Pages.

(Continued)

*Primary Examiner* — Liang Che A Wang
(74) *Attorney, Agent, or Firm* — Liang IP, PLLC

(57) ABSTRACT

Techniques of partition abstraction in a wide area network are disclosed herein. In one example, a method includes receiving, at a partition of the wide area network, a request to perform a computing task with a computing resource in the wide area network, the computing resource having a resource identifier. In response to receiving the request, the method also includes determining whether the resource identifier of the computing resource includes a partition embedded globally unique identifier (PEGUID) and in response to determining that the resource identifier includes a PEGUID, extracting the PEGUID from the resource identifier and decoding the PEGUID to identify a partition corresponding to the computing resource.

20 Claims, 7 Drawing Sheets

(56) References Cited

U.S. PATENT DOCUMENTS

2016/0072800 A1* 3/2016 Soon-Shiong ...... H04L 63/0861
726/7
2018/0032351 A1* 2/2018 He ....................... G06F 9/4406

OTHER PUBLICATIONS

"Global, Regional, and Zonal Resources", Retrieved from: https://web.archive.org/web/20210324193831/https:/cloud.google.com/compute/docs/regions-zones/global-regional-zonal-resources, Mar. 24, 2021, 7 Pages.

* cited by examiner

PARTITION ABSTRACTION IN DISTRIBUTED COMPUTING SYSTEMS

BACKGROUND

Corporations, enterprises, schools, charities, government offices, and other types of organizations often deploy private computer networks commonly referred to as intranets. An intranet is a type of wide area network (WAN) that can span countries and geographical regions. Intranets can allow users of an organization to securely store and share information within the organization. For example, an intranet can include a file management system that is configured to store, track, or otherwise manage internal documents of an organization. In contrast, the term "internet" typically refers to a public computer network among individuals and enterprises. One example internet contains billions interconnected of computer devices worldwide based on the TCP/IP protocol and is commonly referred to as the Internet.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Wide area networks can often be partitioned for ease of management and maintenance. For example, a wide area network can be partitioned into regional networks according to geographical regions, such as North America, Europe, etc. In other examples, multiple partitions may be implemented in a geographical region, such as Western Europe, central Europe, etc. In further examples, a wide area network can be partitioned according to countries, zones, or other suitable criteria. Each regional networks can include computing resources such as compute, storage, network, or other suitable types of resources. A core network can interconnect individual regional networks to form the overall wide area network.

In partitioned wide area networks, computing resources from different partitions can often be interconnected to provide certain computing services for users. For example, a compute resource, such as a virtual machine may be provisioned in a first computing system at a first partition to execute an application. A storage resource, such as a database containing data records necessary for execution of the application can be provided by a second computing system at a second partition. During operation, data records from the database at the second partition can be transmitted to the virtual machine executing the application in the first partition to provide a computing service to a user. Such computing is sometimes referred to as hybrid computing.

During initialization of the foregoing computing task for hybrid computing, a user can submit a request to establish a connection between the compute resource at the first partition and the storage resource at the second partition. In certain implementations, the user can specify or be prompted to input partition information of the compute and storage resources for performing the computing task. However, specifications by or inquiries of the user for partition information may not be user friendly. For instance, the user may not even know the partition information of the compute and storage resources. If the user knows and specifies the partition information, the connection between the compute and storage resources is tied to the specified first and second partitions. As such, neither the compute nor the storage resource may be moved to other partitions during execution of the computing task. Such non-movability can reduce flexibility of hybrid computing.

In other implementations, a centralized database of the wide area network can be deployed to map individual computing resources to corresponding partitions. For example, a centralized database can maintain database records of all computing resources in the wide area network and corresponding partitions such as geographical locations. Deploying such a centralized database, however, can have certain drawbacks. First, the centralized database can be a single point of failure for the entire wide area network. If the centralized database fails, communications among partitions in the wide area network can be interrupted. Also, maintaining the centralized database can consume large amounts of computing resources. Updates to the centralized database are performed every time a computing resource in the wide area network is created, modified, moved, or deleted in any of the partitions. As such, large amounts of compute, network, storage resources may be used to maintain the centralized database current.

Several embodiments of the disclosed technology can address certain aspects of the foregoing difficulties by implementing partition abstraction in wide area networks. In certain implementations, a wide area network can be partitioned into multiple regional or local area networks interconnected to one another via, for instance, a core network. Each local area network can include a local mapping database, a partition health database, and a partition cache database. The local mapping database can be configured to contain database records of computing resources located in a local partition. The partition health database can be configured to contain database records identifying remote partitions of the wide area network that are reachable from a local partition. The partition cache database can be configured to store database records of previously identified computing resources in the remote partitions of the wide area network.

During initialization of a computing task, a deployment agent in a local partition can be configured to perform a lookup in the local mapping database to locate specified computing resources. If the specified computing resources are in the local partition, the deployment agent can be configured to retrieve connection configurations (e.g., handshake protocols, etc.) from, for instance, a data storage in the local partition, and establish a connection between the specified computing resources based thereon. The computing resources can then be tasked to perform the requested computing task and provide an execution result to the user.

If one of the specified computing resources is not in the local partition and thus without a corresponding database record in the local mapping database, the deployment agent can be configured to determine whether a resource identifier of the computing resource encodes partition information of the computing resource. In according to embodiments of the disclosed technology, at least a portion of the resource identifier can include a Partition Embedded Globally Unique Identifier (PEGUID). For instance, a compute resource can be identified by the following example resource identifier:

subscription/123e4567-e89b-12d3/resource/123 in which the string, e.g., "123e4567-e89b-12d3" is a PEGUID. In other embodiments, the PEGUID can include other types of alphanumeric strings or numbers.

During operation, in response to determining, for example, based on a format of the string, that the resource identifier includes a PEGUID, the deployment agent can be configured to parse the PEGUID, e.g., "123e4567-e89b-12d3" and decode a partition identifier. Various encoding/decoding schemes may be used for the PEGUID. In one implementation, a first and/or last byte of the PEGUID may be extracted and converted into one or more ASCII characters. In other implementations, a threshold number of characters in the PEGUID may be used as a partition identifier. Upon determining the partition identifier, the deployment agent can be configured to identify the corresponding remote partition by, for instance, perform a lookup in the partition identifier table at the local partition. The deployment agent can be configured to then retrieve suitable connection configurations based on the identified remote partition and establish a connection according to the retrieved connection configurations.

In response to determining that the resource identifier does not include a PEGUID (e.g., the resource identifier includes a public IP address according to IPv4), the deployment agent can be configured to perform a lookup in the partition cache database to determine whether partition information of the computing resource is in the partition cache database. In response to determining that partition information of the computing resource is in the partition cache database, the deployment agent can be configured to identify the corresponding remote partition, retrieve suitable connection configurations based on the identified remote partition, and establish a connection according to the retrieved connection configurations.

In response to determining that partition information of the computing resource is not in the partition cache database, the deployment agent can be configured to perform a lookup in the partition health database to identify all remote partitions that are currently reachable from the local partition. Upon identifying the remote partitions, the deployment agent can be configured to transmit queries to the reachable remote partitions using, for instance, the public IP address of the computing resource as keywords. Upon receiving the queries, the reachable remote partitions can search respective local mapping databases and transmit responses indicating whether the remote partitions contain the computing resource with the public IP address. Upon receiving the responses, the deployment agent can be configured to identify, from the received responses, the remote partition that hosts the computing resource. The deployment agent can then retrieve suitable connection configurations based on the identified remote partition and establish a connection according to the retrieved connection configurations. In certain embodiments, the foregoing query and response operations can be performed in a batch fashion. For example, the deployment agent in the local partition can be configured to transmit queries to subsets of the reachable remote partitions in sequence. In further embodiments, a network connection between the local partition and a reachable remote partition can be cached in the local partition such that re-establishing such a network connection can be avoided to reduce latency of the query and response operations.

Several embodiments of the disclosed technology can provide a seamless deployment experience for hybrid computing to the user without adding a single point of failure in the wide area network. In certain embodiments, the deployment agent can readily identify partition information of a computing resource in the wide area network based on the PEGUID included in a resource identifier of the computing resource. In other embodiments in which PEGUIDs are not present in a resource identifier, the deployment agent can be configured to identify reachable remote partitions, broadcast queries to the identified reachable remote partitions, and identify which one of the reachable partitions hosts the corresponding computing resource based on responses received from the reachable remote partitions. Using the identified reachable remote partition, the deployment agent can be configured to establish a connection between a computing resource at the local partition and the computing resource at the remote partition without prompting the user for the partition information for any of the computing resources or deployment of a centralized database that map the computing resources to corresponding partitions. The deployment agent can also be configured to establishing a new connection to the computing resource upon receiving a notification that the computing resource has been moved to a new partition.

DETAILED DESCRIPTION

Figure 1A:
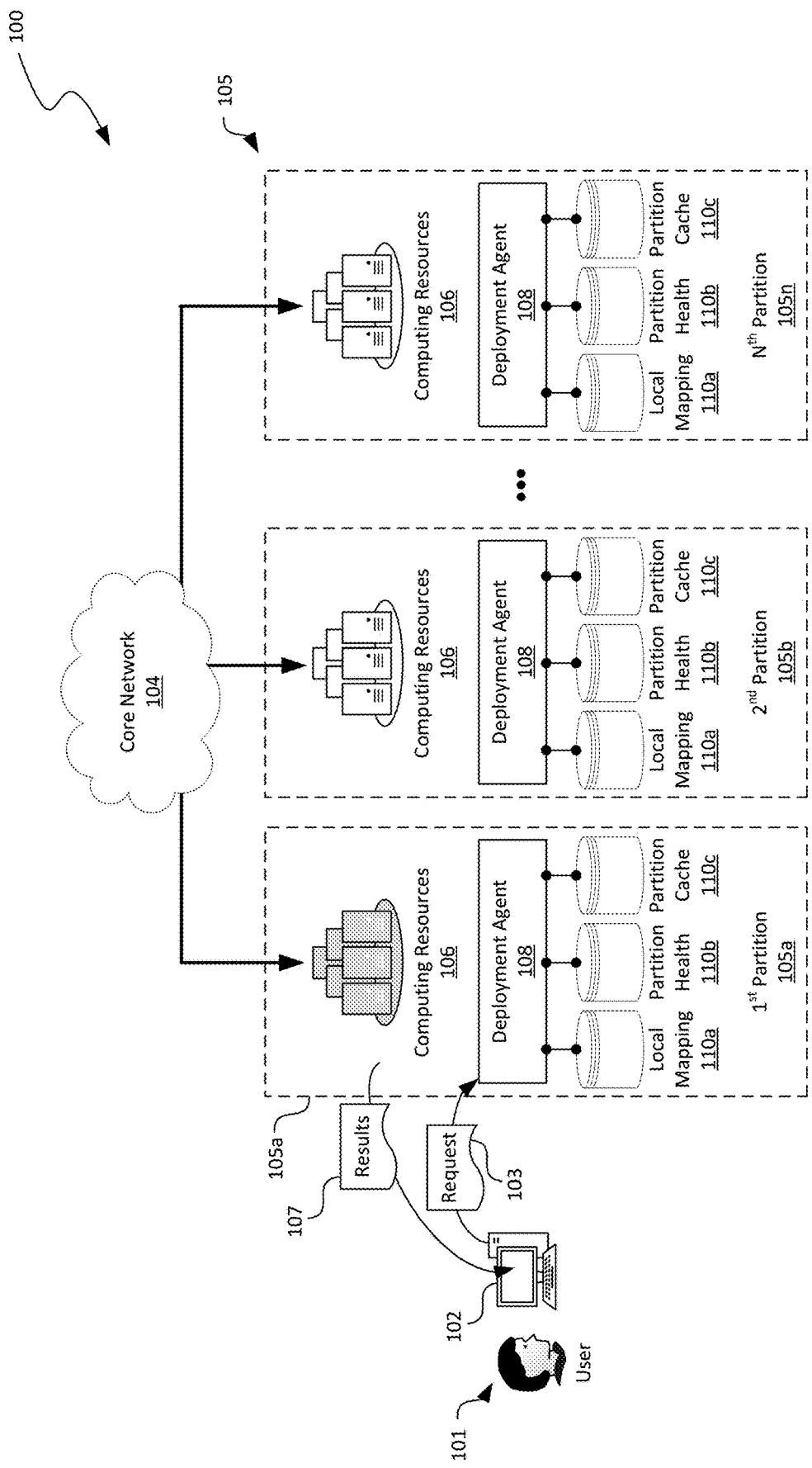
FIGS. 1A-2B are schematic diagrams illustrating a distributed computing system organized as a wide area network implementing partition abstraction in accordance with embodiments of the disclosed technology.

Certain embodiments of systems, devices, components, modules, routines, data structures, and processes for partition abstraction in a distributed computing system are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-5.

As used herein, a "wide area network" generally refers to an interconnected computer network having a plurality of network devices that interconnect a plurality of servers or hosts to one another or to external networks (e.g., the Internet). At least some of the servers or hosts can be in, for example, different datacenters at diverse geographic locations, such as countries or regions. The term "network device" generally refers to a physical network device, examples of which include routers, switches, hubs, bridges, load balancers, security gateways, or firewalls. A "host" generally refers to a computing device configured to implement, for instance, one or more virtual machines, container, or other suitable virtualized components. For example, a host can include a server having a hypervisor configured to support one or more virtual machines or other suitable types of virtual components.

In accordance with embodiments of the disclosed technology, a wide area network can be logically and/or physically divided into multiple partitions. Each partition can include a local or regional network with corresponding computing resources. Multiple local or regional networks can be interconnected by a core network that allows communications between computing resources in different partitions. In certain implementations, computing resources can be migrated or reassigned from one partition to another. In other implementations, computing resources can also be created, modified, or deleted in a corresponding partition.

Also used herein, the term "system resource" or "computing resource" generally refers to any physical or virtual component of limited availability within a distributed computing system such as a wide area network. Example computing resources can include processor capacities (e.g., CPUs or cores), network capacities (e.g., network connections and network bandwidth), and computer readable storage capacities (e.g., memory blocks in solid state devices). Executing an application in a wide area network can consume various amount and types of computing resources. For example, executing an application for voice-over-IP conference can consume a certain amount of compute, storage, and network resources. In another example, executing an application of database management can consume a certain amount of processor and storage resources.

As used herein, a "computing service" generally refers to computing resources provided to users over a computer network such as the Internet. Common examples of computing services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

In addition, as used herein, a Partition Embedded Globally Unique Identifier (PEGUID) is a Globally Unique Identifier (GUID) that encodes partition information of a computing resource in a wide area network. In certain implementations, a PEGUID can be a part of a resource identifier of a computing resource and can have certain formats indicating partition information embedding. For example, a PEGUID can include a string (e.g., "123e4567-e89b-12d3" in the format of an eight character string and two four character strings separated by two dashes. In other examples, a PEGUID can have other suitable formats. During operation, a PEGUID can be extracted from a resource identifier and decoded to derive a partition identifier. The partition identifier can then be used as a key to lookup a table to identify a partition that hosts the corresponding computing resource. Further details of decoding a PEGUID are described below with reference to FIGS. 1A-2B.

In partitioned wide area networks, computing resources from different partitions can often be interconnected to provide computing services for users. During initialization of such a computing task, partition information of involved computing resources can be input by a user or can be looked up in a centralized database containing a mapping of computing resources and corresponding partitions. However, inquiring the user for the partition information can render the computing service not user friendly while the centralized database can become a single point of failure in the wide area network. Also, maintaining the centralized database can consume large amounts of computing resources because updates to the centralized database are performed every time a computing resource in the wide area network is created, modified, moved, or deleted in any of the partitions.

Several embodiments of the disclosed technology can address certain aspects of the foregoing difficulties by implementing partition abstraction in wide area networks. In certain implementations, a PEGUID can be inserted into a resource identifier such that the resource identifier contains partition information that correspond to the identified computing resource. In other implementations, broadcast and response operations can be performed from one partition to other reachable partitions to identify one of the other partitions that hosts the computing resource. As such, several embodiments of the disclosed technology can provide a seamless deployment experience for utilizing computing resources in different partitions without adding a single point of failure in the wide area network.

FIGS. 1A-2B are schematic diagrams illustrating a distributed computing system organized as a wide area network 100 implementing partition abstraction in accordance with embodiments of the disclosed technology. As shown in FIG. 1A, a wide area network 100 can be physically and/or logically divided into multiple partitions 105 of local or regional networks. Each partition 105 can include respective computing resources 106, such as servers, network devices, storage devices, etc. The computing resources 106 in the multiple partitions 105 can also communicate with one another via a core network 104 that interconnects the multiple partitions 105.

The client device 102 can include a computing device that facilitates access by a user 101 to computing services provided by the wide area network 100. For example, in the illustrated embodiment, the client device 102 includes a desktop computer. In other embodiments, the client device 102 can also include smartphones, tablets, laptops, or other suitable computing devices. Even though only one user 101 is shown in FIG. 1A for illustration purposes, in other embodiments, the wide area network 100 can be configured to facilitate any suitable number of users 101 to access the computing services provided by the wide area network 100.

As shown in FIG. 1A, the partitions 105 can individually include a deployment agent 108 that is configured to implement partition abstraction in the wide area network 100. In certain embodiments, the deployment agent 108 can be a computing service provided by executing suitable instructions using computing resources 106 in respective partitions 105. In other embodiments, the deployment agent 108 can include a physical computing device (e.g., a server) with suitable instructions execution of which provides the target computing service. In further embodiments, the deployment agent 108 can be a part of a computing platform controller, such as a fabric controller in a datacenter, or have other suitable configurations.

Also shown in FIG. 1A, the partitions 105 can individually include a local mapping database 110a, a partition health database 110b, and a partition cache database 110c. The local mapping database 110a can be configured to contain database records of computing resources located in a local partition 105, such as the first partition 105a, the second partition 105b, or the $N^{th}$ partition 105n. The partition health database 110b can be configured to contain database records identifying remote partitions 105 of the wide area network 100 that are reachable from a local partition 105. For example, the partition health database 110b in the first partition 105a can include database records identifying that the second partition 105b and the Nth partition 105n can be reached by the first partition 105a. Data representing reachability of the partitions 105 can be exchanged between the partitions 105 via a suitable communication channel periodically, on demand, or in other suitable manners. The partition cache database 110c can be configured to store database records of previously identified computing resources 106 in the remote partitions 105 of the wide area network 100. For example, the partition cache database 110c in the first partition 105a can include database records identifying that a computing resource 106 (e.g., a virtual machine) has been previously resolved to the second partition 105b.

During performance of a computing task with computing resources 106 from multiple partitions 105, the deployment agent 108 can be configured to provide partition abstraction based on the database records in the local mapping database 110a, the partition health database 110b, and the partition cache database 110c. In the illustrated example in FIG. 1A, the user 101 submits a request 103 for performing a computing task to the deployment agent 105a in the first partition 105a. In other examples, the request 103 can also be submitted to the second or $N^{th}$ partition 105b and 105n. In response to receiving the request 103, the deployment agent 108 in the first partition 105a can be configured to perform a lookup in the local mapping database 110a to locate specified computing resources 106 for the computing task based on, for instance, a resource identifier, a URL of the computing resources 106, etc.

In response to determining that the specified computing resources 106 are in the first partition 105a (i.e., the local partition), the deployment agent 108 can be configured to retrieve connection configurations (e.g., handshake protocols, etc.) from, for instance, a data storage (shown collectively as the computing resources 106) in the first partition 105a and establish a connection between the specified computing resources 106 (shown in FIG. 1A with shading) based thereon. The computing resources 106 can then be tasked to perform the requested computing task and provide an execution result 107 to the client device 102 of the user 101.

In response to determining that one of the specified computing resources 106 is not in the first partition 105a and thus without a corresponding database record in the local mapping database 110a in the first partition 105a, the deployment agent 108 can be configured to determine whether a resource identifier of the computing resource 106 encodes partition information of the computing resource 106. In according to embodiments of the disclosed technology, at least a portion of the resource identifier can include a PEGUID. For instance, a compute resource 106 can be identified by the following example resource identifier:

subscription/123e4567-e89b-12d3/resource/123 in which the string, e.g., "123e4567-e89b-12d3" is a PEGUID based on a format of the string. In other embodiments, the PEGUID can include other types of alphanumeric strings or numbers and/or formats thereof.

In response to determining, for example, based on a format of the string, that the resource identifier includes a PEGUID, the deployment agent 108 can be configured to parse the PEGUID, e.g., "123e4567-e89b-12d3" and decode a partition identifier. Various encoding/decoding schemes may be used for the PEGUID. In one implementation, a first and/or last byte of the PEGUID may be extracted and converted into one or more ASCII characters. In other implementations, a threshold number of characters in the PEGUID may be used as a partition identifier. Upon determining the partition identifier, the deployment agent 108 can be configured to identify the corresponding remote partition by, for instance, perform a lookup in the partition identifier table (not shown) at the first partition 105a. The deployment agent 108 in the first partition 105a can be configured to then retrieve suitable connection configurations based on the identified remote partition(s) 105 and establish connection(s) 112 according to the retrieved connection configurations.

In response to determining that the resource identifier does not include a PEGUID (e.g., the resource identifier includes a public IP address according to IPv4), the deployment agent 108 can be configured to perform a lookup in the partition cache database 110c in the first partition 105a to determine whether partition information of the computing resource 106 is in the partition cache database 110c. In response to determining that partition information of the computing resource 106 is in the partition cache database 110c, the deployment agent 108 in the first partition 105a can be configured to identify the corresponding remote partition 105, retrieve suitable connection configurations based on the identified remote partition 105, and establish connection(s) 112 according to the retrieved connection configurations.

Figure 1B:
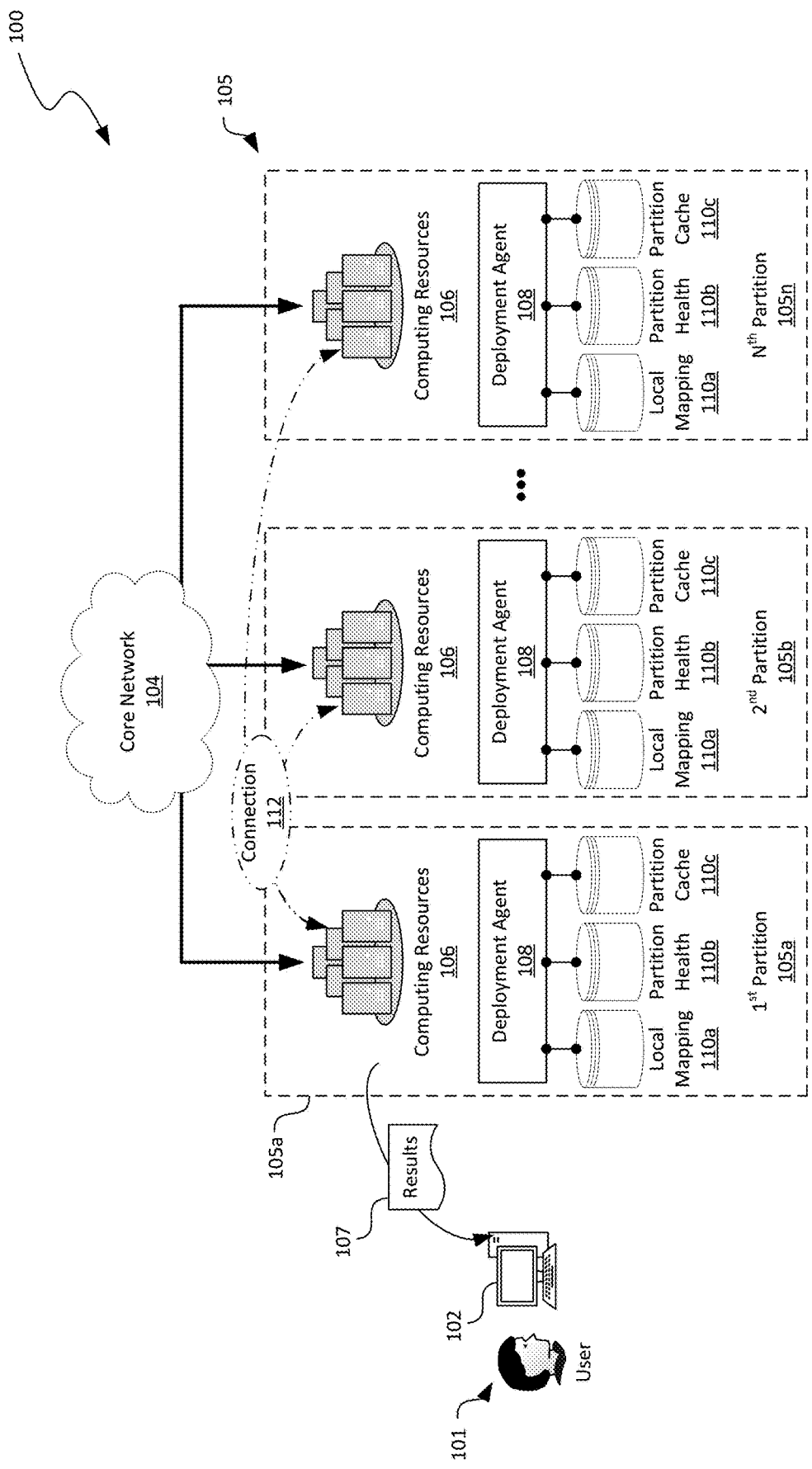

As shown in the illustrated example in FIG. 1B, connections 112 can be established between computing resources 106 in the first partition 105a and those in the second and $N^{th}$ partitions 105b and 105n. In other examples, the computing resources 106 in the first partition 105a can also establish connection(s) with computing resources 106 in additional and/or different partitions 105. The computing resources 106 can then be tasked to perform, via the established connections 112, the requested computing task and provide an execution result 107 to the client device 102 of the user 101, as shown in FIG. 1B.

Figure 2A:
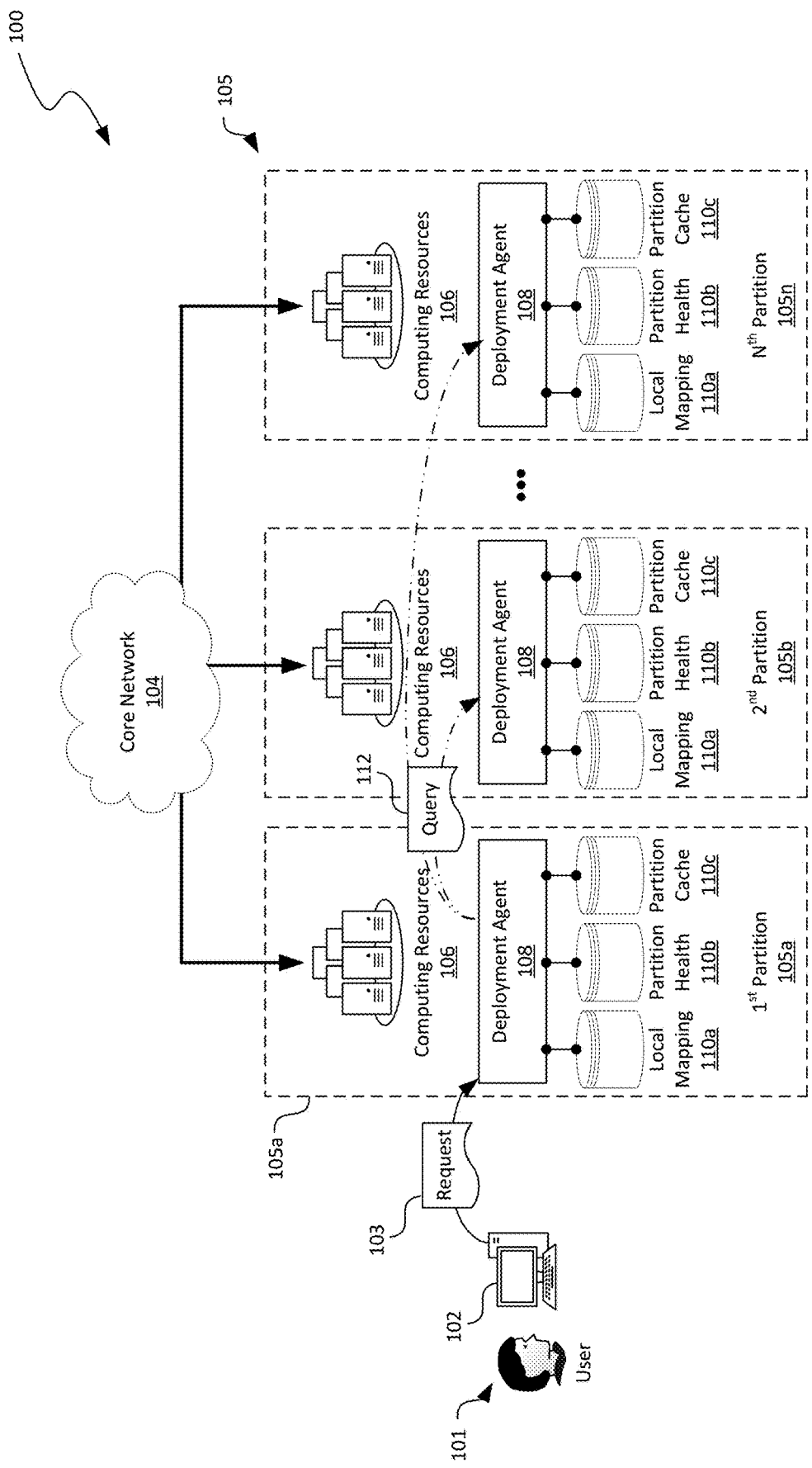

In response to determining that partition information of the computing resource 106 is not in the partition cache database 110c, the deployment agent 108 can be configured to perform a lookup in the partition health database 110b in the first partition 105a to identify all remote partitions 105 that are currently reachable from the first partition 105a, as shown in FIG. 2A. Upon identifying the remote partitions 105, e.g., the second and $N^{th}$ partitions 105b and 105b, the deployment agent 108 can be configured to transmit queries 112 to the reachable remote partitions 105 using, for instance, the public IP address of the computing resource 106 as keywords.

Figure 2B:
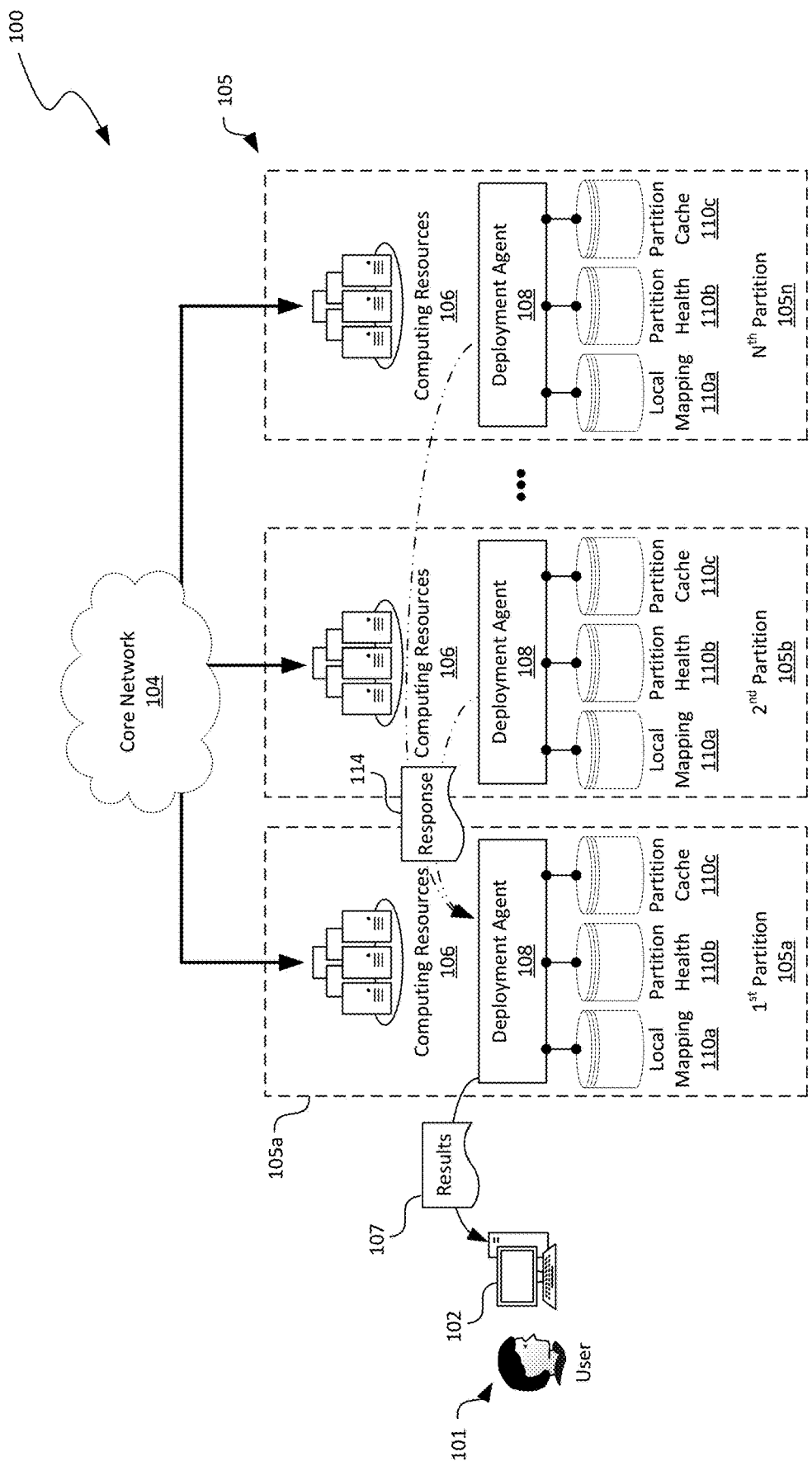

As shown in FIG. 2B, upon receiving the queries 105, the deployment agents 108 (or other suitable components) of the reachable remote partitions 105 can search respective local mapping databases 110a and transmit responses 114 indicating whether the remote partition(s) 105 contain the computing resources 106 with the public IP address. Upon receiving the responses 114, the deployment agent 108 can be configured to identify, from the received responses 114, the remote partition(s) 105 that host the computing resources 106. The deployment agent 108 can then retrieve suitable connection configurations based on the identified remote partition 105 and establish a connection according to the retrieved connection configurations.

In certain embodiments, the foregoing query and response operations can be performed in a batch fashion. For example, the deployment agent 108 in the local partition can be configured to transmit queries 112 to subsets of the reachable remote partitions 105 in sequence. In further embodiments, a network connection between the first partition 105a and a reachable remote partition 105 can be cached in the first partition 105a such that re-establishing such a network connection can be avoided to reduce latency of the query and response operations. Upon identifying the remote partition(s) 105 that host the computing resources

106, the deployment agent 108 in the first partition 105*a* can be configured to retrieve suitable connection configurations based on the identified remote partition 105 and establish connection(s) 112 according to the retrieved connection configurations, as shown in FIG. 1B. The computing resources 106 can then be tasked to perform the requested computing task and provide an execution result 107 to the client device 102 of the user 101.

Several embodiments of the disclosed technology can provide a seamless deployment experience for hybrid computing to the user 101 without adding a single point of failure in the wide area network 100. In certain embodiments, the deployment agent 108 can readily identify partition information of a computing resource 106 in the wide area network 100 based on the PEGUID included in a resource identifier of the computing resource 106. In other embodiments in which PEGUIDs are not present in a resource identifier, the deployment agent 108 can be configured to identify reachable remote partitions 105 using database records from the partition health database 110*b*, broadcast queries 112 to the identified reachable remote partitions 105 and identify which one of the reachable partitions 105 hosts the corresponding computing resource 106 based on responses received from the reachable remote partitions 105. Using the identified reachable remote partition 105, the deployment agent 108 can be configured to establish a connection between a computing resource 106 at the first partition 105*a* and the computing resource 106 at the remote partition 105 without prompting the user 101 for the partition information for any of the computing resources 106 or deployment of a centralized database that map the computing resources 106 to corresponding partitions 105. The deployment agent 108 can also be configured to establishing a new connection to the computing resource 106 upon receiving a notification that the computing resource 106 has been moved to a new partition.

Figure 3:
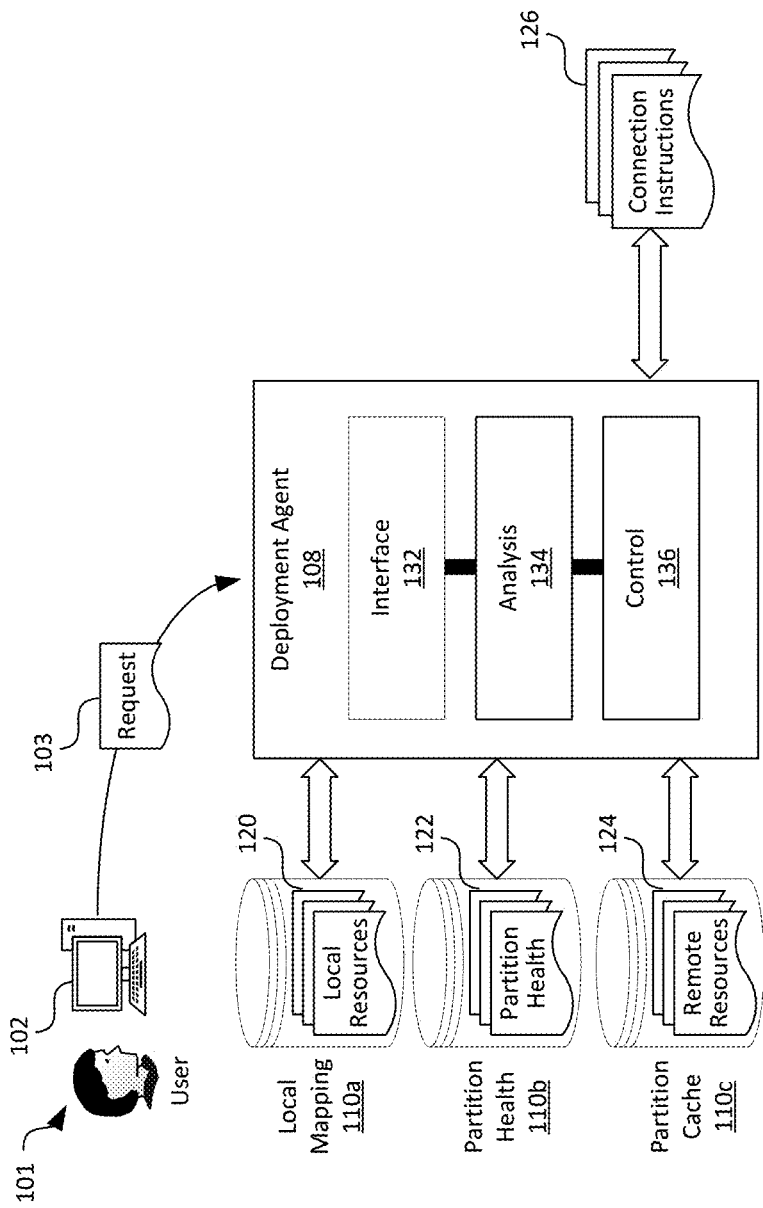
FIG. 3 is a schematic diagram illustrating certain hardware/software components of a deployment agent suitable for the distributed computing system of FIGS. 1A-2B in accordance with embodiments of the disclosed technology.

FIG. 3 is a schematic diagram illustrating certain hardware/software components of a deployment agent 108 suitable for the wide area network 100 of FIGS. 1A-2B in accordance with embodiments of the disclosed technology. In FIG. 3 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3, the deployment agent 108 can include an interface component 132, an analysis component 134, and a control component 136 operatively coupled to one another. Though particular components of the deployment agent 108 are shown in FIG. 3, in other embodiments, the deployment agent 108 can include additional and/or different components and/or modules.

The interface component 132 can be configured to receive a request 103 from the user 101 for performing a computing task using computing resources 106 (FIG. 1A). In certain embodiments, the interface component 132 can be configured to validate the received request 103 based on, for example, a subscription level of the user 101. In other embodiments, the interface component 132 can be configured to authenticate the request 103, verify resource identifiers of the computing resources 106, or perform other suitable operations before forwarding the request 103 to the analysis component 134 for further processing.

The analysis component 134 can be configured to determine a partition 105 (FIG. 1A) that hosts one or more of the specified computing resources 106 in the request 103 based on database records of local resources 120 in the local mapping database 110*a*, partition health 122 in the partition health database 110*b*, and remote resources 124 in the partition cache 110*c*. Example operations the analysis component 134 is configured to perform are described in more detail below with reference to FIGS. 4A and 4B. Upon determining one or more partitions 105 that host the specified computing resources 106, the analysis component 134 can be configured to forward identifies of the determined partitions 105 and corresponding computing resources 106 to the control component 136. In turn, the control component 136 can be configured to generate connection instructions 126 by retrieving suitable connection configurations based on the identified remote partitions 105 and establish a connection according to the retrieved connection configurations.

Figure 4A:
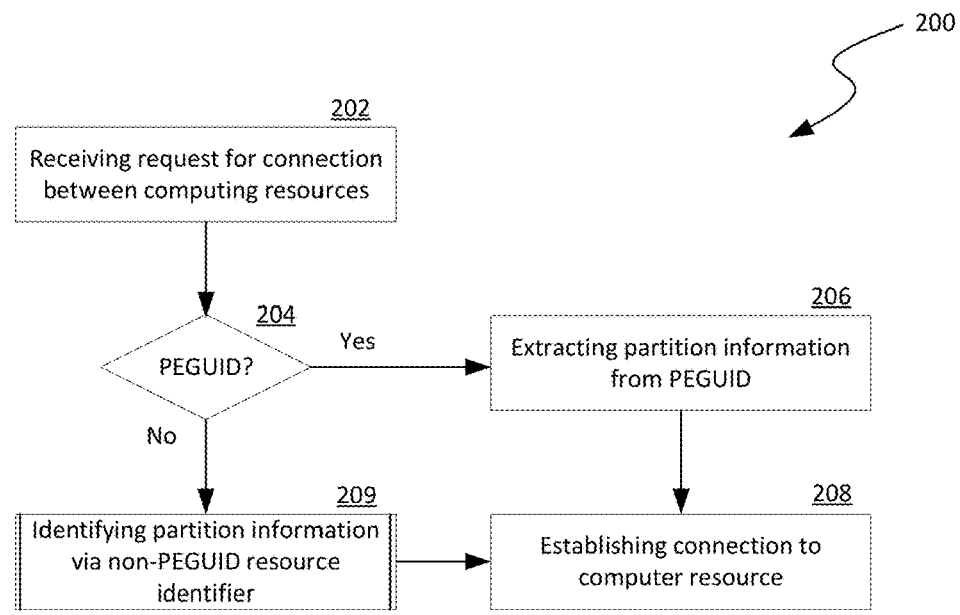
FIGS. 4A and 4B are flowcharts illustrating processes of partition abstraction in a distributed computing system organized as a wide area network in accordance with embodiments of the disclosed technology.
Figure 4B:
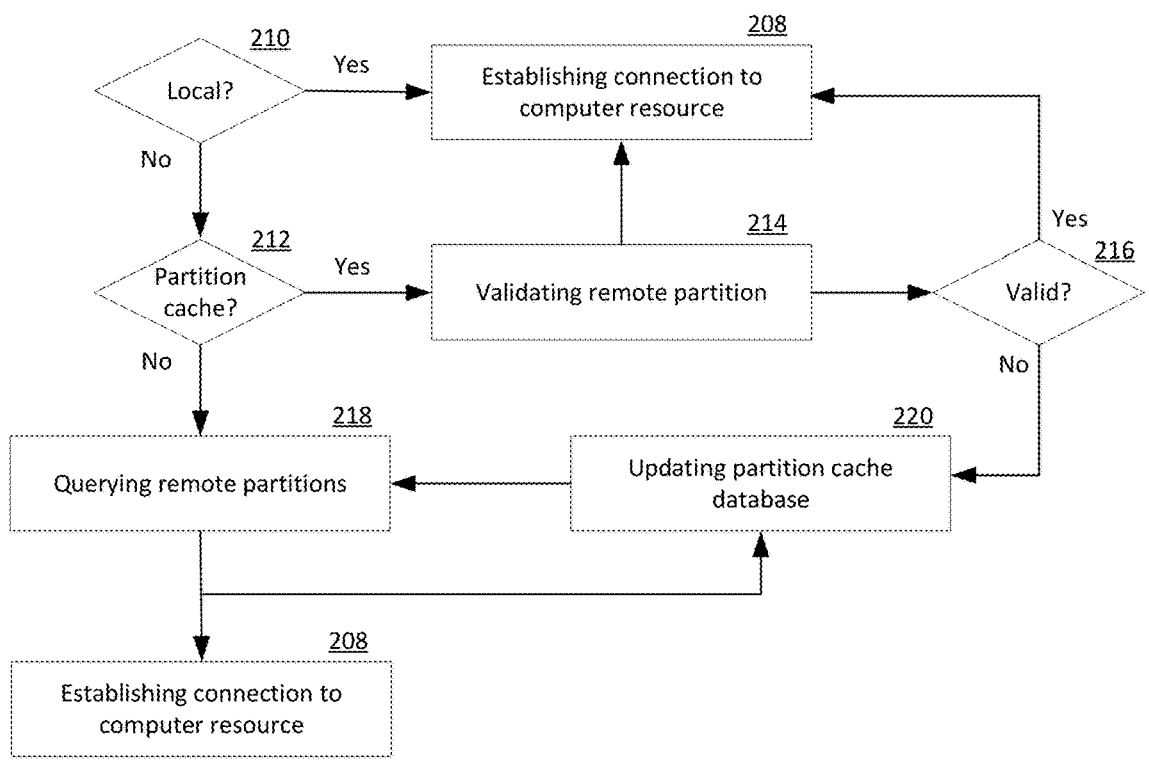

FIGS. 4A and 4B are flowcharts illustrating processes of partition abstraction in a distributed computing system organized as a wide area network 100 in accordance with embodiments of the disclosed technology. Though the processes are described below in the context of the wide area network 100 of FIGS. 1A-2B, in other embodiments, aspects of the disclosed processes can be implemented in other distributed computing systems with additional and/or different components.

As shown in FIG. 4A, a process 200 can include receiving a request for a connection between computing resources at stage 202. The computing resources may be in a single partition or in different partitions. The process 200 can then include a decision stage 204 to determine whether resource identifiers of the computing resources include a PEGUID. A PEGUID can be identified based on a format of a portion of the resource identifier or in other suitable manners. In response to determining that the resource identifiers include a PEGUID, the process 200 includes extracting and decoding the PEGUID from the resource identifiers to identify partitions corresponding to the computing resources at stage 206. The process 200 can then proceed to establishing a connection between the computing resources based on the identified computing resources at stage 208. In response to determining that the resource identifiers do not include a PEGUID, the process 200 proceeds to identifying partition information using the resource identifiers that do not include a PEGUID at stage 209. Example operations of identifying partition information using the resource identifiers that do not include a PEGUID are described in more detail below with reference to FIG. 4B.

As shown in FIG. 4B, operation of identifying partition information using the resource identifiers that do not include a PEGUID can include a decision stage 210 to determine whether a computing resource is local, for example, by performing a lookup in the local mapping database 110a of FIG. 1A. In response to determining that the computing resource is local, the operations proceed to establishing a connection between the computing resources based on the identified computing resources at stage 208.

In response to determining that the computing resource is not local, the operations proceed to another decision stage 212 to determine whether partition information of the computing resource has been determined before by, for example, performing a lookup in the partition cache database 110c of FIG. 1A. In response to determining that partition information of the computing resource has been determined before, the operations proceed to validating the partition information by, for example, requesting validation to a deployment agent 108 (FIG. 1A) in a remote partition at stage 214.

The operations can then include a further decision stage 216 to determine whether the partition information is validated. In response to determining that the partition information is validated, the operations revert to establishing a connection between the computing resources based on the identified computing resources at stage 208. In response to determining that the partition information in the partition cache database is invalidated, the operations proceed to updating the partition cache database to remove or update the database record corresponding to the computing resource before proceeding to querying remote partitions at stage 218.

In response to determining that the partition cache database does not include a database record corresponding to the computing resource, or the partition information in the partition cache database is invalidated, the operation include querying remote partitions for partition information at stage 218. Example operations of querying remote partitions and receiving responses from remote partitions are described above with reference to FIGS. 2A and 2B. Upon identifying a remote partition that hosts the computing resource, the operations can proceed to establishing a connection between the computing resources based on the identified computing resources at stage 208.

Figure 5:
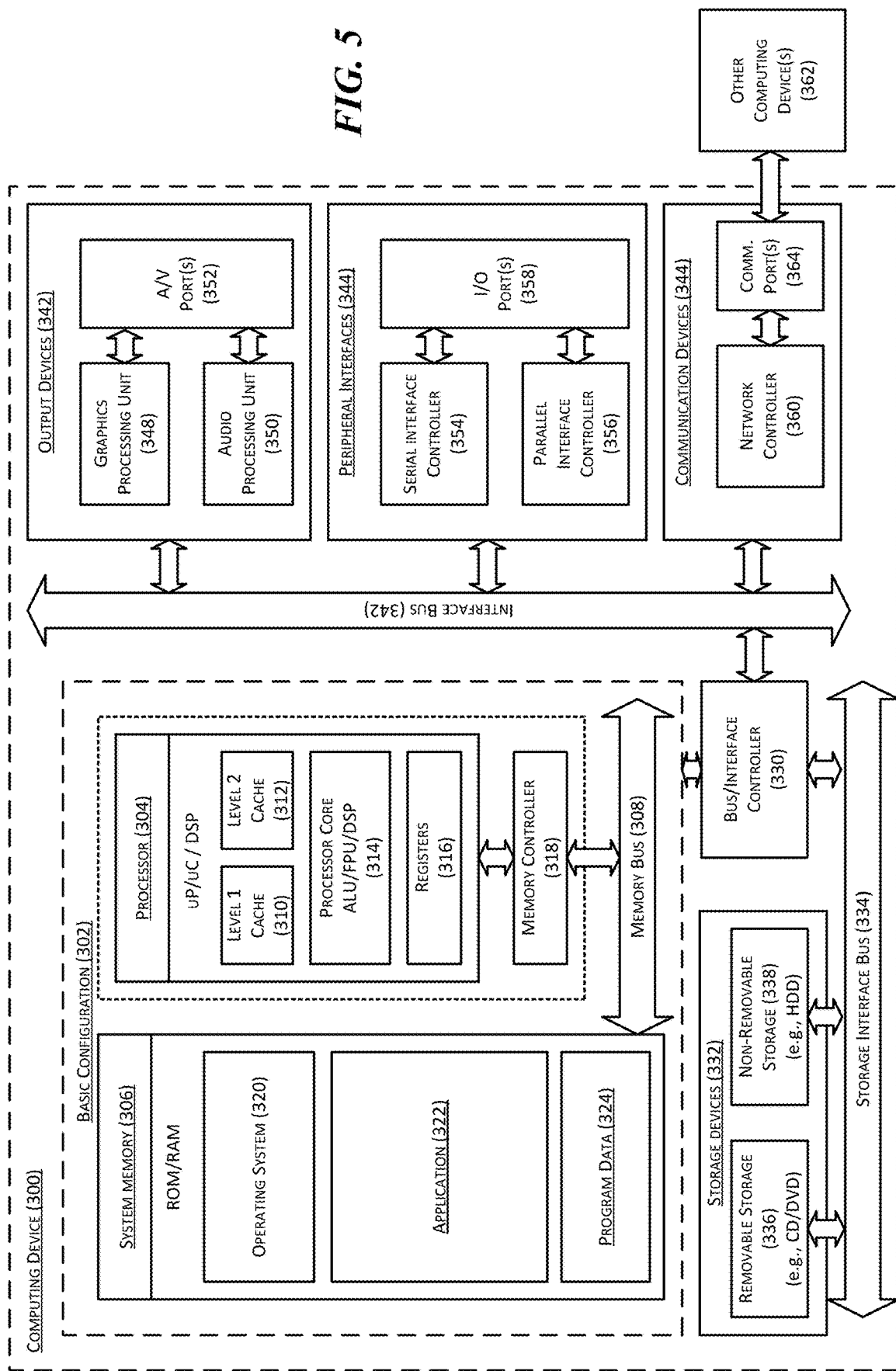
FIG. 5 is a computing device suitable for certain components of the distributed computing system in FIGS. 1A-2B.

FIG. 5 is a computing device 300 suitable for certain components of the distributed computing system 100 in FIGS. 1A-2B. For example, the computing device 300 can be suitable for a server as a computing resource 106 or the client devices 102 of FIGS. 1A-2B. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of partition abstraction in a wide area network having multiple partitions interconnected by a core network, the individual partitions having corresponding computing resources, the method comprising:
   receiving, at a partition of the wide area network, a request to perform a computing task with a computing resource in the wide area network, the computing resource having a resource identifier; and
   in response to receiving the request, at the partition of the wide area network,
      determining whether the resource identifier of the computing resource includes a partition embedded globally unique identifier (PEGUID) based on a format of at least a portion of the resource identifier;
      in response to determining that the resource identifier includes a PEGUID, extracting the PEGUID from the resource identifier;
         decoding the PEGUID to identify a partition corresponding to the computing resource; and
         establishing a connection to the computing resource in the wide area network according to the identified partition; and
         executing the computing task with the computing resource via the established connection; and
      in response to determining that the resource identifier does not include a PEGUID,
         identifying one or more other partitions of the wide area network that are reachable by the partition;
         transmitting to each of the one or more identified partitions of the wide area network, a query for a location of the computing resource based on the resource identifier;
         receiving a response from each of the one or more identified partitions of the wide area network, the response indicating that one of the identified partitions hosts the computing resource; and
         establishing a connection to the computing resource in the one of the identified partitions based on the received response.

2. The method of claim 1 wherein:
   the PEGUID includes a string; and
   decoding the PEGUID includes:
      converting a first or last byte of the string into an ASCII character; and
      identifying the partition corresponding to the computing resource by looking up a table using the ASCII character.

3. The method of claim 1 wherein transmitting the query includes transmitting, in sequence, to subsets of the one or more identified partitions of the wide area network, a query for a location of the computing resource based on the resource identifier.

4. The method of claim 1 wherein transmitting the query includes transmitting, via a cached connection between the partition and the one or more identified partitions, a query for a location of the computing resource based on the resource identifier to each of the one or more identified partitions of the wide area network.

5. The method of claim 1 wherein transmitting the query includes sequentially transmitting, via a cached connection between the partition and the one or more identified partitions, a query for a location of the computing resource based on the resource identifier to subsets of the one or more identified partitions of the wide area network.

6. A method of partition abstraction in a wide area network having multiple partitions interconnected by a core network, the individual partitions having corresponding computing resources, the method comprising:
   receiving, at a partition of the wide area network, a request to perform a computing task with a computing resource in the wide area network, the computing resource having a resource identifier; and
   in response to receiving the request, at the partition of the wide area network,
      determining whether the resource identifier of the computing resource includes a partition embedded globally unique identifier (PEGUID) based on a format of at least a portion of the resource identifier;
      in response to determining that the resource identifier includes a PEGUID,
         extracting the PEGUID from the resource identifier;
         decoding the PEGUID to identify a partition corresponding to the computing resource; and
         establishing a connection to the computing resource in the wide area network according to the identified partition; and
         executing the computing task with the computing resource via the established connection.

7. The method of claim 6 wherein:
the PEGUID includes a string; and
decoding the PEGUID includes:
  converting a first or last byte of the string into an ASCII character; and
  identifying the partition corresponding to the computing resource by looking up a table using the ASCII character.

8. The method of claim 6, further comprising:
in response to determining that the resource identifier does not include a PEGUID,
  determining whether the computing resource is in the partition; and
  in response to determining that the computing device is in the partition, establishing a connection to the computing resource in the partition at which the request is received.

9. The method of claim 6, further comprising:
in response to determining that the resource identifier does not include a PEGUID,
  determining whether the computing resource is in the partition; and
  in response to determining that the computing device is not in the partition,
    determining whether a corresponding partition of the computing resource was previously determined;
    in response to determining that a corresponding partition of the computing resource was previously determined, identifying the corresponding partition, and establishing a connection to the computing resource in the wide area network according to the identified partition.

10. The method of claim 6, further comprising:
in response to determining that the resource identifier does not include a PEGUID,
  determining whether the computing resource is in the partition; and
  in response to determining that the computing device is not in the partition,
    determining whether a corresponding partition of the computing resource was previously determined;
    in response to determining that a corresponding partition of the computing resource was not previously determined,
      identifying one or more other partitions of the wide area network that are reachable by the partition;
      transmitting to each of the one or more identified partitions of the wide area network, a query for a location of the computing resource based on the resource identifier;
      receiving a response from each of the one or more identified partitions of the wide area network, the response indicating that one of the identified partitions hosts the computing resource; and
      establishing a connection to the computing resource in the one of the identified partitions based on the received response.

11. The method of claim 6, further comprising:
in response to determining that the resource identifier does not include a PEGUID,
  determining whether the computing resource is in the partition; and
  in response to determining that the computing device is not in the partition,
    determining whether a corresponding partition of the computing resource was previously determined;
    in response to determining that a corresponding partition of the computing resource was not previously determined,
      identifying one or more other partitions of the wide area network that are reachable by the partition;
      transmitting, in sequence, to subsets of the one or more identified partitions of the wide area network, a query for a location of the computing resource based on the resource identifier;
      receiving a response from each of the one or more identified partitions of the wide area network, the response indicating that one of the identified partitions hosts the computing resource; and
      establishing a connection to the computing resource in the one of the identified partitions based on the received response.

12. The method of claim 6, further comprising:
in response to determining that the resource identifier does not include a PEGUID,
  determining whether the computing resource is in the partition; and
  in response to determining that the computing device is not in the partition,
    determining whether a corresponding partition of the computing resource was previously determined;
    in response to determining that a corresponding partition of the computing resource was not previously determined,
      identifying one or more other partitions of the wide area network that are reachable by the partition;
      transmitting, via a cached connection between the partition and the one or more identified partitions, a query for a location of the computing resource based on the resource identifier to each of the one or more identified partitions of the wide area network;
      receiving a response from each of the one or more identified partitions of the wide area network, the response indicating that one of the identified partitions hosts the computing resource; and
      establishing a connection to the computing resource in the one of the identified partitions based on the received response.

13. The method of claim 6, further comprising
in response to determining that the resource identifier does not include a PEGUID,
  determining whether the computing resource is in the partition; and
  in response to determining that the computing device is not in the partition,
    determining whether a corresponding partition of the computing resource was previously determined;
    in response to determining that a corresponding partition of the computing resource was not previously determined,
      identifying one or more other partitions of the wide area network that are reachable by the partition;
      sequentially transmitting, via a cached connection between the partition and the one or more identified partitions, a query for a location of the computing resource based on the resource identifier to subsets of the one or more identified partitions of the wide area network;

receiving a response from each of the one or more identified partitions of the wide area network, the response indicating that one of the identified partitions hosts the computing resource; and establishing a connection to the computing resource in the one of the identified partitions based on the received response.

14. The method of claim 6, further comprising:

receiving a notification that the computing resource is migrating from the identified partition to another partition in the wide area network; and in response to receiving the notification, establishing another connection to the computing resource in the another partition based on the received notification.

15. A computing device in a partition of a wide area network having multiple other partitions interconnected by a core network, the individual partitions having corresponding computing resources, the computing device comprising:

a processor; and a memory operatively coupled to the processor, the memory containing instructions executable by the processor to cause the computing device to:

upon receiving, at the computing device in the partition of the wide area network, a request to perform a computing task with a computing resource in the wide area network, the computing resource having a resource identifier, determine whether the resource identifier of the computing resource includes a globally unique identifier (GUID) that encodes a partition identifier corresponding to the computing resource based on a format of at least a portion of the resource identifier;

in response to determining that the resource identifier includes a GUID that encodes a partition identifier, extract and decode the GUID from the resource identifier to identify the partition identifier;

determining a partition corresponding to computing resource based on the partition identifier; and establishing a connection to the computing resource in the wide area network according to the identified partition; and executing the computing task with the computing resource via the established connection.

16. The computing device of claim 15 wherein:

the GUID includes a string; and to extract and decode the GUID includes:

convert a first or last byte of the string into an ASCII character representing the partition identifier; and identify the partition corresponding to the computing resource by looking up a table using the ASCII character representing the partition identifier.

17. The computing device of claim 15 wherein the memory includes additional instructions executable by the processor to cause the computing device to:

in response to determining that the resource identifier does not include a PEGUID, determine whether the computing resource is in the partition; and in response to determining that the computing device is in the partition, establish a connection to the computing resource in the partition at which the request is received.

18. The computing device of claim 15 wherein the memory includes additional instructions executable by the processor to cause the computing device to:

in response to determining that the resource identifier does not include a PEGUID, determine whether the computing resource is in the partition; and in response to determining that the computing device is not in the partition, determine whether a corresponding partition of the computing resource was previously determined;

in response to determining that a corresponding partition of the computing resource was previously determined, identify the corresponding partition and establishing a connection to the computing resource in the wide area network according to the identified partition.

19. The computing device of claim 15 wherein the memory includes additional instructions executable by the processor to cause the computing device to:

in response to determining that the resource identifier does not include a PEGUID, determine whether the computing resource is in the partition; and in response to determining that the computing device is not in the partition, determine whether a corresponding partition of the computing resource was previously determined;

in response to determining that a corresponding partition of the computing resource was not previously determined, identify one or more other partitions of the wide area network that are reachable by the partition;

transmit to each of the one or more identified partitions of the wide area network, a query for a location of the computing resource based on the resource identifier;

receive a response from each of the one or more identified partitions of the wide area network, the response indicating that one of the identified partitions hosts the computing resource; and establish a connection to the computing resource in the one of the identified partitions based on the received response.

20. The computing device of claim 15 wherein the memory includes additional instructions executable by the processor to cause the computing device to:

in response to determining that the resource identifier does not include a PEGUID, determine whether the computing resource is in the partition; and in response to determining that the computing device is not in the partition, determine whether a corresponding partition of the computing resource was previously determined;

in response to determining that a corresponding partition of the computing resource was not previously determined, identify one or more other partitions of the wide area network that are reachable by the partition;

sequentially transmit, via a cached connection between the partition and the one or more identified partitions, a query for a location of the computing resource based on the resource identifier to subsets of the one or more identified partitions of the wide area network;

receive a response from each of the one or more identified partitions of the wide area network, the response indicating that one of the identified partitions hosts the computing resource; and
establish a connection to the computing resource in the one of the identified partitions based on the received response.

\* \* \* \* \*